3,832,251
METHOD FOR MANUFACTURING THE EDGE
AND LOWER PLATE OF A SKI FROM WOOD
Agu Yanovich Aarna, bulvar Karla Marxa, 15, kv. 6;
Karl Ritsovich Kiisler, Yakhimekhe Tee, 26, kv. 1;
Peep Gerkhardovich Kristyanson, Sjutiste Tee, 34, kv.
38; Juri Albert-Mikhaelovich Tanner, Sjutiste Tee, 34,
kv. 22; Juri Felixovich Vabaoya, ulitsa Suurtjuki, 5, kv.
1; all of Tallin, U.S.S.R., and Iosif Gershonovich Vait-
senberg, Rizhskoe shosse, 49, kv. 6; Juri Khindrekovich
Rokk, Tallinskoe shosse, 4, kv. 27, and Toomas Oskaro-
vich Matvere, Rizhskoe shosse, 98, kv. 2, all of
Pyarnu Estonskoi, U.S.S.R.
No Drawing. Filed Dec. 30, 1971, Ser. No. 214,470
Claims priority, application U.S.S.R., Mar. 25, 1971,
1631037
Int. Cl. B32b 21/14; B44d 1/26
U.S. Cl. 156—60
6 Claims

ABSTRACT OF THE DISCLOSURE

A method including impregnation of wood with a mixture of a resorcinol monomer and dimethylol-carbamide, taken in a molecular ratio of 1:0.4–1.5 and dissolved in a mixture of water and organic solvents; drying at a temperature not exceeding 60° C. and glueing at a temperature of 80–120° C. and under a pressure of 5–50 kg./cm.$^2$.

---

The present invention relates to methods for the improvement of wood, carried out with a view of bettering its mechanical properties and, more particularly, to a method for manufacturing the edge and lower plate of a ski and other articles from wood, with respect to which requirements of high strength, wear- and water-resistance, elasticity, etc. are set forth.

Known in the art is a method for manufacturing the lower plate of a ski and other articles from wood, which resides in that a veneer is filled with synthetic resin and, after the latter is solidified under a pressure of 80–120 kg./cm.$^2$, is glued to a non-impregnated veneer.

When manufacturing an article, the plate thus produced is glued to other parts made from wood at the side of the non-impregnated veneer.

(Cf. Polish Patent No. 37,476, Class: 38 c, 1/01.)

It is inexpedient to manufacture the lower plate of a ski by this method, as in this case great residual stresses appear in the ski and it becomes straightened.

For this reason the afore-described method has not found wide application, and hickory having unlimited possibilites is used for making the lower plate and edge of a ski.

However, it is inexpedient either from the economic viewpoint to manufacture the edge from hickory as the yield of the edge from shaped timber is rather low. Besides, as compared to the other types of wood, hickory does not hold skiing ointment properly and, therefore, does not provide for a uniform sliding surface.

When manufacturing the edge of a ski, hickory is substituted with plastics, such as micarta (U.S.S.R. Inventor's Certificate No. 188,873; Cl, 77b, 5$^{12}$), or use is made of a plastic edge manufactured by the firms "Esko Jervinen," "Sundins," "Mueller."

However, mass production of skis having a plastic edge or an edge made from plasticized wood is a labor-consuming process in which it is especially difficult to connect the edge to the other parts of a ski.

Besides, the sliding surface made from plastics is equally slidable in all directions and holds skiing ointment poorly.

The main object of the present invention is to provide such a method of manufacturing the edge and lower plate of a ski and other articles from wood, that would make it possible to produce articles with high mechanical properties of wood, such as wear- and water-resistance and elasticity.

Another object of the present invention is to provide a method of manufacturing the edge and lower plate of a ski, that would hold skiing ointment well.

Yet another objects of the present invention is to provide a method that would make it possible to manufacture the edge and lower plate of a ski and other articles, and to simultaneously strength the wood.

Still another object of the present invention is to provide a method of manufacturing the edge and lower plate of a ski and other articles from wood, that would ensure strengthening of wood and preserve, at the same time, its main properties allowing it to be treated by conventional techniques used in the wood-working industry.

These and other objects are accomplished by that when manufacturing the edge and lower plate of a ski and other articles from wood by way of its impregnation, drying and glueing under pressure in the course of heating, according to the present invention, a mixture of a resorcinol monomer and dimethylolcarbamide taken in a molecular ratio of 1:0.4–1.5 and dissolved in a mixture of water and organic solvents is used as the impregnating composition, the wood is dried at a temperature not exceeding 60° C., and is glued at a temperature of 80–120° C. and under a pressure of 5–50 kg./cm.2, during the latter operation polycondensation of the monomers takes place.

It is expedient to add N-methylol derivatives of a lactam to the impregnating composition.

N-methylol-caprolactam taken in an amount of up to 1.5 moles per 1 mole of the resorcinol component may be used as the N-methylol derivative of a lactam.

Orcinol or resorcinol may be used as the resorcinol monomer.

It is expedient to use an aqueous solution of ethanol as the organic solvent for the impregnating composition.

The subject-matter of the present invention lies in strengthening wood under soft conditions, and preservation, at the same time, of the main structural and technological properties of the wood. This is attained due to impregnation of wood with monomers which, owing to the small volume of their molecules, fill the wood completely and uniformly; drying under soft conditions, which makes it possible to preserve the impregnating compositions in the form of monomers; and polycondensation of monomers which preserve the main structure of wood but, due to the selected composition, ensure strengthening of the wood.

In addition to the expensive and scarce resorcinol and orcinol, we have also used as the resorcinol monomer a mixture of shale alkyl-resorcinol which, as compared to resorcinol, is more liable to polycondensation. Dimethylolcarbamide and methylol-caprolactam are used as a donor of formaldehyde, since under the conditions of impregnation and drying they are stable and under the conditions of wood strengthening they are polycondensed with the resorcinol.

Use of methylol-caprolactam contributes to higher elasticity of the strengthened wood.

Use of a mixture of water and ethanol as a solvent provides for a complete solution of the monomers and allows the drying process to be carried out at a moderate temperature.

The subject-matter of the method according to the present invention is clarified by the following specific examples of manufacture of the edge and lower plate of a ski.

First, the impregnating composition was prepared, for which purpose resorcinol, dimethylol-carbamide and methylol-caprolactam were dissolved in an aqueous solution and simultaneously stirred until a homogenous mixture was prepared.

Table 1 which is given below cites specific examples of the use of the resorcinol monomer weight amounts and molecular ratios of the components of the impregnating composition as well as the amount of the solvent used.

TABLE 1

| No. of example | Resorcinol monomer | Composition, in weight parts | | | Molecular ratio (A:B:C) | Type of solvent | Amount of solvent in parts by weight |
|---|---|---|---|---|---|---|---|
| | | Resorcinol monomer (A) | Dimethylolcarbamide (B) | Methylolcaprolactam (C) | | | |
| 1 | Mixture of shale alkyl-resorcinol | 100 | 72 | | 1:0.9:0 | 60% ethanol plus 40% water | 260 |
| 2 | Resorcinol | 100 | 98 | | 1:0.9:0 | do | 300 |
| 3 | Orcinol | 100 | 87 | | 1:0.9:0 | do | 280 |
| 4 | Mixture of shale alkyl-resorcinol | 100 | 40 | | 1:0.5:0 | do | 210 |
| 5 | do | 100 | 120 | | 1:1.5.0 | do | 330 |
| 6 | do | 100 | 40 | 48 | 1:0.5:0.5 | do | 280 |
| 7 | do | 100 | 40 | 143 | 1:0.5:1.5 | do | 280 |

The veneer that was to be impregnated was placed into the impregnating composition in such a manner that the whole wood was covered with the mixture, and was kept there until its complete impregnation.

After the impregnation operation the veneer was placed into a drying chamber in which it was kept until the solvent was completely evaporated.

The duration of the impregnation and the parameters of the drying and glueing processes are given in Table 2.

TABLE 2

| No. of example | Duration of impregnation, in hrs. | Drying | | Glueing with simultaneous strengthening | |
|---|---|---|---|---|---|
| | | Temperature, in °C. | Duration in hrs. | Temperature, in °C. | Specific pressure, in kg./cm.² |
| 1 | 18 | 50 | 2 | 105 | 12 |
| 2 | 18 | 50 | 2 | 105 | 12 |
| 3 | 18 | 50 | 2 | 105 | 12 |
| 4 | 18 | 50 | 2 | 105 | 12 |
| 5 | 18 | 50 | 2 | 105 | 12 |
| 6 | 18 | 50 | 2 | 105 | 12 |
| 7 | 18 | 50 | 2 | 105 | 12 |

The impregnated and dried veneer and a non-impregnated veneer are glued together to form a block.

The block is sawed into separate parts which are essentially the lower plates of skies having a strengthened edge.

In the case of manufacture of a ski lower plate strengthened along its whole sliding surface, the plate is assembled from several layers of the impregnated and dried veneer, and is glued together with all the other parts to form a ski, the lower plate being simultaneously strengthened.

Impregnated wood of soft types had high strength properties which are superior even to those of the types of wood that are strong by their nature, which is seen from Table 3.

TABLE 3

Type of wood:  Abrasion resistance (g./dm.² hr.)
Hickory _____ 3.2
Strengthened birch veneer according to Example 1 _____ 1.6–1.9
Strengthened birch veneer according to Example 6 _____ 1.2

Glued joints of the samples made from a non-strengthened and a strengthened birch veneer had a high strength and water-resistance (see Table 4).

TABLE 4

| Glued joints | Shear strength, in kg./cm.² | | |
|---|---|---|---|
| | Conditions under which samples are stored | | |
| | Reference ones | 24 hours in cold water | 1 hour in boiling water |
| Non-strengthened birch veneer | 19.5 | 21.4 | 15.4 |
| Strengthened birch veneer | 19.2 | 32.3 | 27.0 |

What is claimed is:

1. In a process for manufacturing the edge and lower plate of a ski from wood, comprising the steps of impregnating the wood with an impregnating composition, drying the impregnated wood, and glueing the dried impregnated wood to an unimpregnated wood under pressure at elevated temperatures, the improvement utilizing as the impregnating composition a mixture consisting essentially of a resorcinol monomer selected from the group consisting of resorcinol, orcinol and alkyl resorcinols and dimethylol-carbamide in a molar ratio of 1:0.4–1.5, and dissolved in a solvent consisting of water and ethanol, said glueing being carried out at a temperature of 80–120° C. and under a pressure of 5–50 kg./cm.², during which step there occurs polycondensation of the resorcinol monomer and the dimethylolcarbamide.

2. A method according to claim 1, whereby an N-methylol derivative of a lactam is added to the impregnating composition.

3. A method according to claim 2, whereby N-methyl-caprolactam in an amount of up 1.5 moles per 1 mole of the resorcinol monomer is used as the N-methylol derivative of a lactam.

4. A method according to claim 1, whereby orcinol is used as the resorcinol monomer.

5. A method according to claim 1, whereby resorcinol is used as the resorcinol monomer.

6. A method according to claim 1, whereby a mixture of shale alkyl-resorcinol is used as the resorcinol monomer.

References Cited

UNITED STATES PATENTS

| 2,452,200 | 10/1948 | Kvalnes et al. | 117—148 |
| 3,267,053 | 8/1966 | Nagle et al. | 117—148 |
| 2,983,629 | 5/1961 | Anderson | 117—148 |
| 3,639,658 | 2/1972 | Soldatos | 117—161 L |
| 2,391,489 | 12/1945 | Stamm et al. | 117—148 |
| 2,716,075 | 8/1955 | Wiese | 117—148 |
| 3,300,427 | 1/1967 | Hebert | 117—148 |
| 2,834,745 | 5/1958 | Weber | 117—148 |
| 2,330,826 | 10/1943 | Hunn | 117—148 |
| 2,352,740 | 7/1944 | Shannon | 117—148 |
| 2,740,728 | 4/1956 | Sownabend et al. | 117—148 |

WILLIAM D. MARTIN, Primary Examiner

W. R. TRENOR, Assistant Examiner

U.S. Cl. X.R.

117—148, 161 L; 161—268, 270; 280—11:13 R, 12 R